United States Patent
Nakajima (10) Patent No.: US 7,272,267 B1
(45) Date of Patent: Sep. 18, 2007

(54) IMAGE PROCESSING METHOD AND APPARATUS FOR NORMALIZING FACES FOR A LAYOUT IMAGE

(75) Inventor: Nobuyoshi Nakajima, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 09/447,256

(22) Filed: Nov. 23, 1999

(30) Foreign Application Priority Data

Nov. 27, 1998 (JP) .................................. 10-336998

(51) Int. Cl.
  *G06K 9/32* (2006.01)
  *G06K 9/36* (2006.01)
  *H04N 1/387* (2006.01)

(52) U.S. Cl. .................. 382/294; 382/284; 382/291; 358/450

(58) Field of Classification Search ................ 382/118, 382/291, 284, 294, 293, 173; 396/2; 358/3.24, 358/450, 1.9; 283/77
  See application file for complete search history.

(56) References Cited

U.S. PATENT DOCUMENTS

| | | | |
|---|---|---|---|
| 4,618,991 A * | 10/1986 | Tabata et al. ................ | 382/296 |
| 4,965,662 A | 10/1990 | Shiota | |
| 5,109,281 A * | 4/1992 | Kobori et al. ............... | 358/450 |
| 5,278,921 A | 1/1994 | Nakamura et al. | |
| 5,410,609 A * | 4/1995 | Kado et al. .................. | 382/118 |
| 5,604,820 A | 2/1997 | Ono | |
| 5,604,823 A | 2/1997 | Ono | |
| 5,619,593 A | 4/1997 | Ono | |
| 5,740,274 A | 4/1998 | Ono et al. | |
| 5,751,831 A | 5/1998 | Ono | |
| 5,850,463 A * | 12/1998 | Horii .......................... | 382/118 |
| 5,878,165 A | 3/1999 | Ono | |

(Continued)

FOREIGN PATENT DOCUMENTS

DE 4230449 A 3/1994

(Continued)

OTHER PUBLICATIONS

Sobottka et al. "Segmentation and tracking of faces in color images". Proceedings of the Second International Conference on Automatic Face and Gesture Recognition. Oct. 1996. pp. 236-241.*

(Continued)

*Primary Examiner*—Colin LaRose
(74) *Attorney, Agent, or Firm*—Birch, Stewart, Kolasch & Birch, LLP (57) ABSTRACT

Face information is detected from each of original image signals, each of the original image signals representing a person image, in which a face pattern of a person is embedded. The face information represents a position and/or a size of the face pattern of the person in the person image represented by each original image signal. A face pattern normalizing process is performed on each of the original image signals and in accordance with the detected face information, and a plurality of normalized image signals are obtained from the face pattern normalizing process. A plurality of images, which are represented by the normalized image signals, are laid out in a predetermined layout, and a layout image signal representing the thus formed layout image is obtained. A layout image, such as a school photo, is thus capable of being formed efficiently.

21 Claims, 4 Drawing Sheets

U.S. PATENT DOCUMENTS 5,905,807 A * 5/1999 Kado et al. .................. 382/118
6,049,674 A * 4/2000 Yamamoto et al. ............ 396/2
6,424,752 B1 * 7/2002 Katayama et al. .......... 382/294

FOREIGN PATENT DOCUMENTS

| EP | 0323849 A2 | 7/1989 |
|---|---|---|
| EP | 532053 A | 3/1993 |
| JP | 07-303250 | 11/1995 |
| JP | 10-224609 | 8/1998 |

OTHER PUBLICATIONS

Japan Abstract 62289824, May 27, 1988.
Japanese Abstract 10221609 Aug. 21, 1998.

* cited by examiner

IMAGE PROCESSING METHOD AND APPARATUS FOR NORMALIZING FACES FOR A LAYOUT IMAGE

BACKGROUND OF THE INVENTION

1. Field of the Invention

This invention relates to an image processing method and apparatus for laying out person images, which have been obtained by photographing a plurality of persons, and forming a layout image, such as a school photo. This invention also relates to a recording medium, on which a program for causing a computer to execute the image processing method has been recorded and from which the computer is capable of reading the program.

2. Description of the Prior Art

Figure 5:
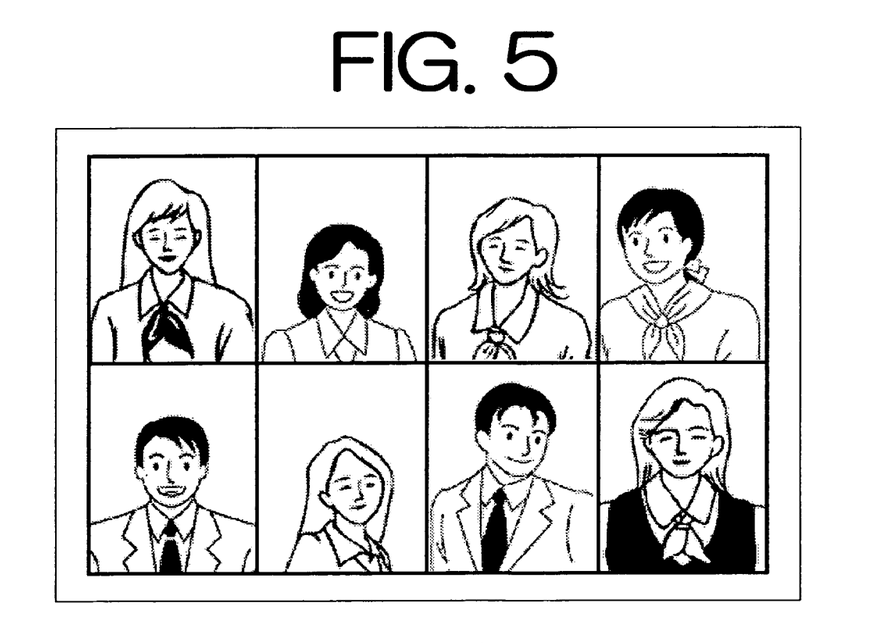
FIG. 5 is a schematic view showing a layout image, in which a plurality of person images have not been normalized.

Album prints, typically school photos, are formed by laying out person images, which have been obtained by photographing persons, in predetermined layouts, thus obtaining layout images, and printing the layout images. As illustrated in FIG. 5, if the person images are merely laid out in a layout image comprising the person images, positions and/or sizes of face patterns of the persons will vary for different person images, and the layout image will become unsightly. Therefore, it may be considered to take photographs such that the positions and/or the sizes of the face patterns of the persons in the photographs may be uniform. However, in cases where photographs of a plurality of persons are taken, considerable time and labor are required to take the photographs by changing the position of the camera in accordance with the heights of the persons and/or the sizes of the faces of the persons. Also, the position of the camera with respect to the persons varies for different cameramen and different dates of photographing. Accordingly, it is difficult to take the photographs such that the positions and/or the sizes of the face patterns of the persons in all of the photographs may be uniform.

Therefore, in cases where a layout image is to be formed, when operations for printing from sheets of negative film, on which person images have been recorded, are performed, the positions of the sheets of negative film and/or the positions of photosensitive materials have heretofore been adjusted such that the positions and/or the sizes of the face patterns of the persons may be uniform among the images. Alternatively, a layout image has heretofore been formed by laying out person images, which have been obtained by performing a trimming process such that the positions and/or the sizes of the face patterns of the persons may be uniform. As another alternative, a layout image has heretofore been formed by printing person images to a comparatively large size, arraying the prints of the person images such that the positions of the face patterns of the persons may be approximately uniform, and again performing the photographing operation.

However, with the technique for forming a layout image by adjusting the positions of the sheets of negative film and/or the positions of the photosensitive materials and performing the printing operations, and with the technique for forming a layout image by arraying the printed images again performing the photographing operation, the efficiency of the layout image formation and the productivity of the layout images cannot be kept high.

SUMMARY OF THE INVENTION

The primary object of the present invention is to provide an image processing method, wherein a layout image, such as a school photo, is capable of being formed efficiently.

Another object of the present invention is to provide an apparatus for carrying out the image processing method.

The specific object of the present invention is to provide a recording medium, on which a program for causing a computer to execute the image processing method has been recorded and from which the computer is capable of reading the program.

The present invention provides an image processing method for obtaining a layout image signal representing a layout image, in which a plurality of person images are laid out, from a plurality of original image signals, each of the original image signals representing a person image, in which a face pattern of a person is embedded, the method comprising the steps of:

i) detecting face information from each of the original image signals, the face information representing a position and/or a size of the face pattern of the person in the person image represented by each original image signal, ii) performing a face pattern normalizing process on each of the original image signals and in accordance with the detected face information, a plurality of normalized image signals being obtained from the face pattern normalizing process, and iii) laying out a plurality of images, which are represented by the normalized image signals, in a predetermined layout, whereby the layout image signal representing the thus formed layout image is obtained.

The term "face information" as used herein means, for example, the information representing a displacement quantity for transformation of a person image such that the position of the face pattern in the person image may coincide with a position in a predetermined reference image or a predetermined coordinate position. Also, the term "face pattern normalizing process" as used herein means a process for transforming the original image signal with an affine transformation technique, or the like, such that the positions and/or the sizes of the face patterns of the persons may become uniform among the person images.

The present invention also provides an image processing apparatus for obtaining a layout image signal representing a layout image, in which a plurality of person images are laid out, from a plurality of original image signals, each of the original image signals representing a person image, in which a face pattern of a person is embedded, the apparatus comprising:

i) detection means for detecting face information from each of the original image signals, the face information representing a position and/or a size of the face pattern of the person in the person image represented by each original image signal, ii) normalization means for performing a face pattern normalizing process on each of the original image signals and in accordance with the detected face information, a plurality of normalized image signals being obtained from the face pattern normalizing process, and iii) editing means for laying out a plurality of images, which are represented by the normalized image signals, in a predetermined layout, and obtaining the layout image signal representing the thus formed layout image.

The present invention further provides a recording medium, on which a program for causing a computer to execute the image processing method in accordance with the present invention has been recorded and from which the computer is capable of reading the program.

With the image processing method and apparatus in accordance with the present invention, the face patterns of the persons in the person images are normalized, and the normalized image signals are thereby obtained. The images, which are represented by the normalized image signals, are laid out in the predetermined layout, and the layout image signal representing the thus formed layout image is obtained. Therefore, in the layout image reproduced from the layout image signal, the positions and/or the sizes of the face patterns of the persons become uniform. Accordingly, the layout image, in which the positions and/or the sizes of the face patterns of the persons are uniform, can be formed efficiently. As a result, the productivity of layout images, such as school photos, can be enhanced.

DESCRIPTION OF THE PREFERRED EMBODIMENTS

The present invention will hereinbelow be described in further detail with reference to the accompanying drawings.

Figure 1:
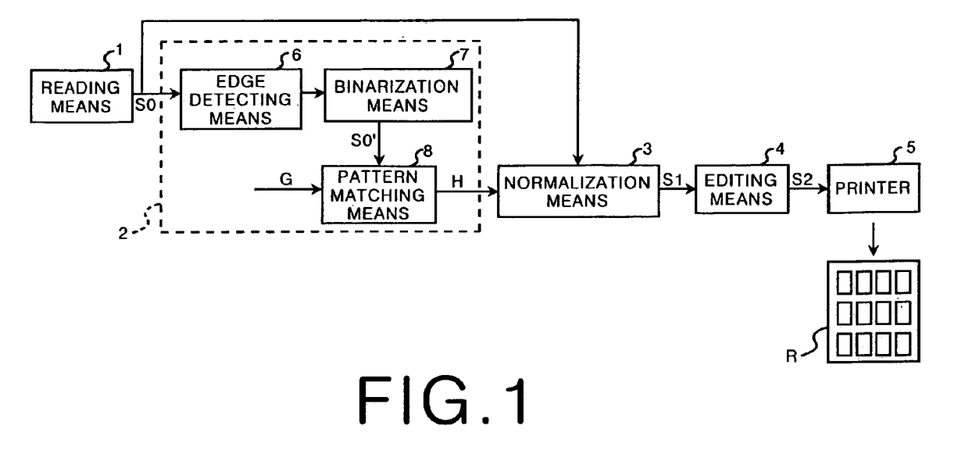
FIG. 1 is a block diagram showing an album printing system, in which an embodiment of the image processing apparatus in accordance with the present invention is employed.

FIG. 1 is a block diagram showing an album printing system, in which an embodiment of the image processing apparatus in accordance with the present invention is employed. With reference to FIG. 1, the album printing system comprises reading means 1 for reading out a plurality of original image signals S0, S0, . . . , each of which represents a person image. The album printing system also comprises detection means 2 for detecting face information H from each of the original image signals S0, S0, . . . having been received from the reading means 1. The face information H represents a displacement quantity, which is to be utilized in a face pattern normalizing process for uniformizing the positions and/or the sizes of face patterns in the person images. The album printing system further comprises normalization means 3 for performing affine transformation on each of the original image signals S0, S0, and in accordance with the corresponding face information H, and thereby obtaining a plurality of normalized image signals S1, S1, . . . representing images, in which the positions and/or the sizes of the face patterns of the persons have been normalized. The album printing system still further comprises editing means 4 for laying out the images, which are represented by the normalized image signals S1, S1, . . . , in a predetermined layout, and obtaining a layout image signal S2 representing a layout image R, in which the plurality of the person images have been laid out. The album printing system also comprises a printer 5 for reproducing the layout image R from the layout image signal S2.

The original image signals S0, S0, . . . may be obtained from a read-out apparatus, such as a scanner, which reads out the person images from negative film or positive film. Alternatively, the original image signals S0, S0, . . . may be obtained from image sensing operations performed by a digital camera. The thus obtained original image signals S0, S0, . . . are stored on a storage medium or a storage device. The reading means 1 reads the original image signals S0, S0, . . . from the storage medium or the storage device.

Figure 2:
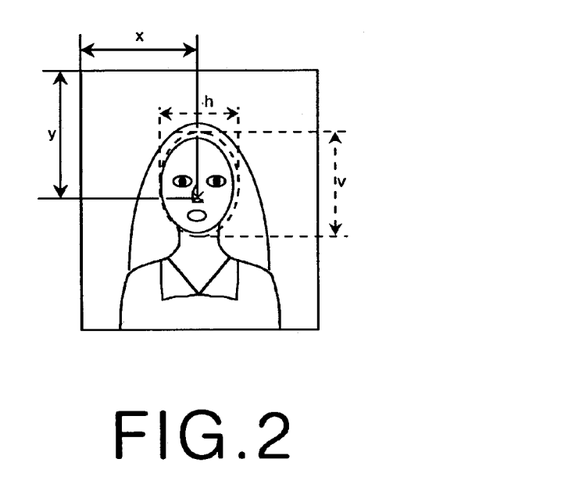
FIG. 2 is an explanatory view showing a person image.

The detection means 2 comprises edge detecting means 6 for detecting edges in the face pattern embedded in the person image, which is represented by each original image signal S0. The detection means 2 also comprises binarization means 7 for binarizing the original image signal S0, which has been obtained from the edge detection, and obtaining a binary signal S0'. The detection means 2 further comprises pattern matching means 8. The pattern matching means 8 performs a pattern matching process on the binary signal S0' and a reference signal G, which represents a predetermined binary reference image. The pattern matching means 8 thus detects at least two points, at which the degree of correlation between the person image and the reference image is highest. Also, the pattern matching means 8 determines displacement quantities, which are to be utilized for transforming a center position having coordinates (x, y) in the face pattern embedded in the person image as illustrated in FIG. 2 into a center position having coordinates (x0, y0) in the reference image, and uniformizing a size v of the face pattern in the vertical direction and a size h of the face pattern in the horizontal direction. The detection means 2 feeds information, which represents the thus determined displacement quantities, as the face information H into the normalization means 3. The reference image represents a contour image of a face having a predetermined size, which contour image is located such that it may have the center position at the predetermined coordinates (x0, y0).

In accordance with the face information H received from the detection means 2, the normalization means 3 performs affine transformation on the original image signal S0 and obtains a normalized image signal S1. The affine transformation is performed with Formula (1) shown below.

$$\begin{pmatrix} x2 \\ y2 \end{pmatrix} = \begin{pmatrix} a & b \\ -b & a \end{pmatrix} \cdot \begin{pmatrix} x1 \\ y1 \end{pmatrix} + \begin{pmatrix} c \\ d \end{pmatrix} \qquad (1)$$

in which (x1, y1) represents the coordinate values of the person image before being transformed, and (x2, y2) represents the coordinate values of the person image after being transformed.

With the coordinate transformation performed with Formula (1), all of the image size enlargement or reduction of the person image represented by the original image signal S0, the rotation of the entire person image, and the parallel translation of the person image are achieved simultaneously.

The coefficients a, b, c, and d in Formula (1) are determined in the manner described below. Specifically, Formula (1) can be divided into Formulas (2) and (3) shown below.

$$x2 = ax1 + by1 + c \qquad (2)$$

$$y2 = -bx1 + ay1 + d \qquad (3)$$

The two points in the person image, which are detected by the pattern matching process as the points having the highest degree of correlation with the reference image, may have coordinates (x11, y11) and coordinates (x12, y12). Also, the two points in the reference image, which correspond to the two points in the person image, may have coordinates (x21, y21) and coordinates (x22, y22). In such cases, Formulas (4), (5), (6), and (7) shown below obtain.

$$x21=ax11+by11+c \quad (4)$$

$$x22=ax12+by12+c \quad (5)$$

$$y21=-bx11+ay11+d \quad (6)$$

$$y22=-bx12+ay12+d \quad (7)$$

The four coefficients a, b, c, and d can be calculated by solving Formulas (4), (5), (6), and (7).

Figure 3:
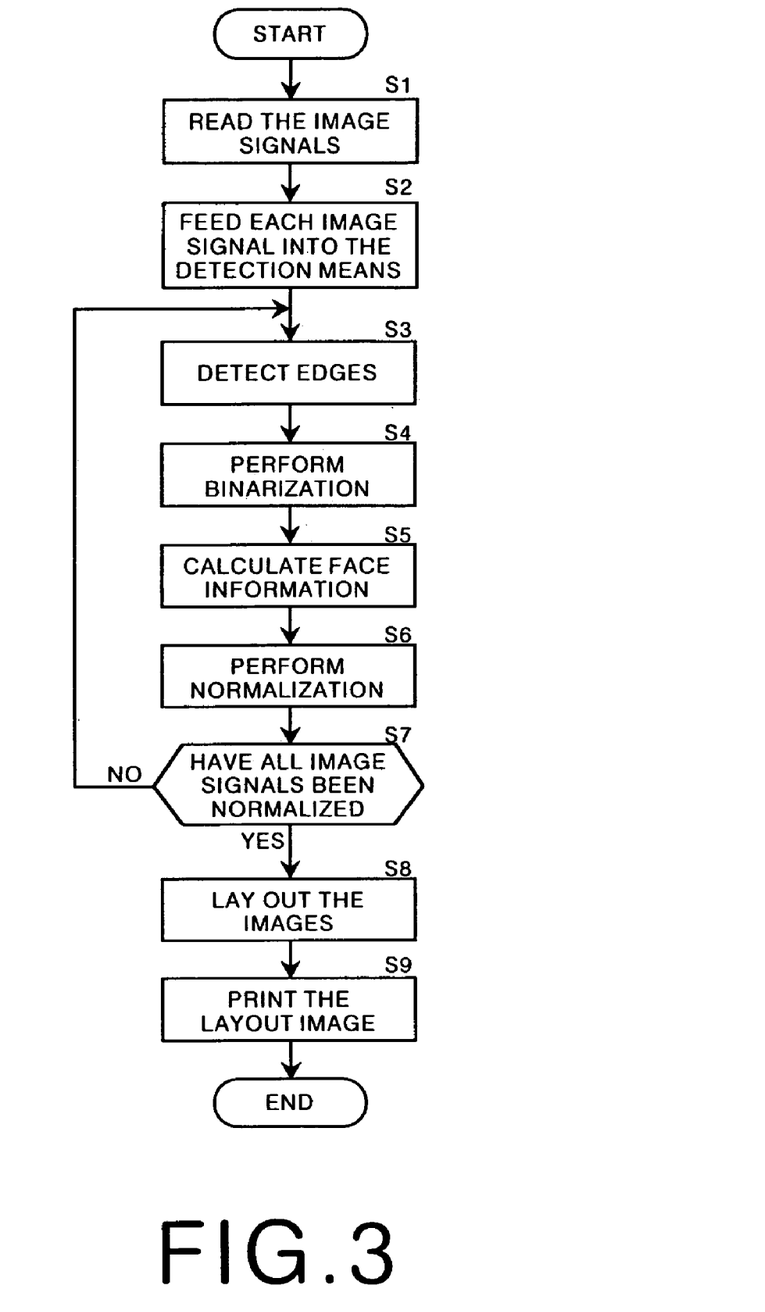
FIG. 3 is a flow chart showing how the embodiment of the image processing apparatus in accordance with the present invention operates.

How this embodiment operates will be described hereinbelow. FIG. 3 is a flow chart showing how the embodiment of the image processing apparatus in accordance with the present invention operates.

With reference to FIG. 3, firstly, in a step S1, the reading means 1 reads the original image signals S0, S0, from the storage medium or the storage device. In a step S2, each of the original image signals S0, S0, . . . is fed into the detection means 2. In a step S3, the edge detecting means 6 of the detection means 2 performs a differentiation process, or the like, on the original image signal S0 and detects edges in the person image represented by the original image signal S0. In a step S4, the binarization means 7 performs a binarizing process on the original image signal S0, which has been obtained from the edge detection, the binary signal S0' is obtained from the binarizing process. Thereafter, in a step S5, the pattern matching means 8 calculates the displacement quantities, which are to be utilized for transforming the center position having the coordinates (x, y) in the face pattern embedded in the person image into the center position having the coordinates (x0, y0) in the reference image, and uniformizing the size v of the face pattern in the vertical direction and the size h of the face pattern in the horizontal direction. The information, which represents the calculated displacement quantities, is fed as the face information H into the normalization means 3.

In a step S6, the normalization means 3 calculates the affine transformation coefficients with Formula (1) and in accordance with the face information H, performs the affine transformation on the original image signal S0, and obtains the normalized image signal S1 representing the image, in which the position and/or the size of the face pattern of the person has been normalized. In a step S7, a judgment is made as to whether all of the original image signals S0, S0, . . . having been read by the reading means 1 have been or have not been normalized. In cases where it has been judged that all of the original image signals S0, S0, . . . have not been normalized, the processes from the step S2 to the step S6 are iterated. In cases where it has been judged that all of the original image signals S0, S0, . . . have been normalized, in a step S8, the editing means 4 lays out the images, which are represented by the normalized image signals S1, S1, . . . , in a predetermined layout and obtains the layout image signal S2 representing the layout image R. Thereafter, in a step S9, the printer 5 prints the layout image R in accordance with the layout image signal S2.

Figure 4:
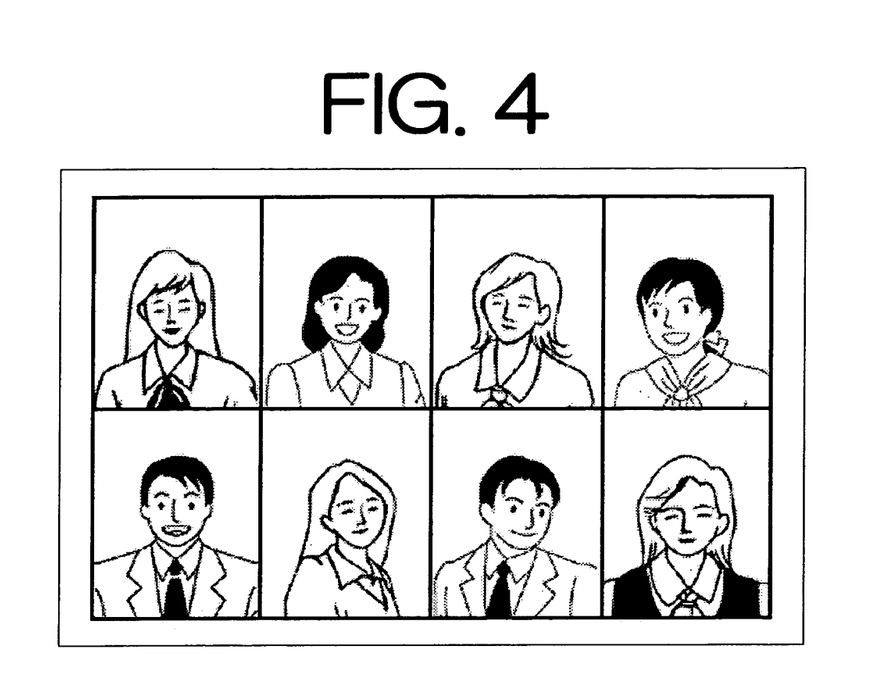
FIG. 4 is a schematic view showing a layout image, in which a plurality of person images have been normalized.

In this manner, with this embodiment, the process for normalizing the face patterns of the persons in the person images is performed on the original image signals S0, S0, . . . representing the person images, and the normalized image signals S1, S1, . . . are thereby obtained. The images, which are represented by the normalized image signals S1, S1, . . . , are laid out in the predetermined layout, and the layout image signal S2 representing the thus formed layout image is obtained. Therefore, as illustrated in FIG. 4, in the layout image R reproduced from the layout image signal S2, the positions and/or the sizes of the face patterns of the persons become uniform. Accordingly, the layout image R, in which the positions and/or the sizes of the face patterns of the persons are uniform, can be formed efficiently. As a result, the productivity of layout images R, R, . . . , such as school photos, can be enhanced.

In the embodiment described above, the detection means 2 detects at least two points having the highest degree of correlation by performing the pattern matching process and calculates the affine transformation coefficients a, b, c, and d to be utilized for the normalization of the position and/or the size of the face pattern of the person in the person image. In cases where only the position of the face pattern of the person in the person image is to be compensated for, only one point having the highest correlation may be detected, and the position of the face pattern may be uniformized in accordance with the detected point. In this manner, the normalization of the face pattern can be performed quickly.

Also, in the embodiment described above, the detection means 2 detects the edges in the person image, performs the pattern matching with the reference image, and thereby calculates the displacement quantities. Alternatively, the displacement quantities may be calculated with a technique described in, for example, Japanese Unexamined Patent Publication No. 6(1994)-67320. Specifically, the person image may be divided into a plurality of regions in accordance with the distributions of the hue and saturation values in the person image, and a face candidate region may be detected. A face region may then be detected in accordance with the shape of a neighboring region, which is located in the vicinity of the face candidate region. Thereafter, the pattern matching process as described above may be performed on the signal representing the face region, and the displacement quantities may thereby be calculated. As another alternative, an ellipse circumscribed about a simply detected face candidate region may be formed, and the displacement quantities with respect to the reference image may be calculated by taking the center point of the ellipse as the center position of the face pattern having the coordinates (x, y). The face region may be detected with one of various other techniques. For example, the face region may be detected by utilizing neural network techniques described in, for example, Japanese Unexamined Patent Publication Nos. 5(1993)-274438 and 5(1993)-307605.

Figure 6:
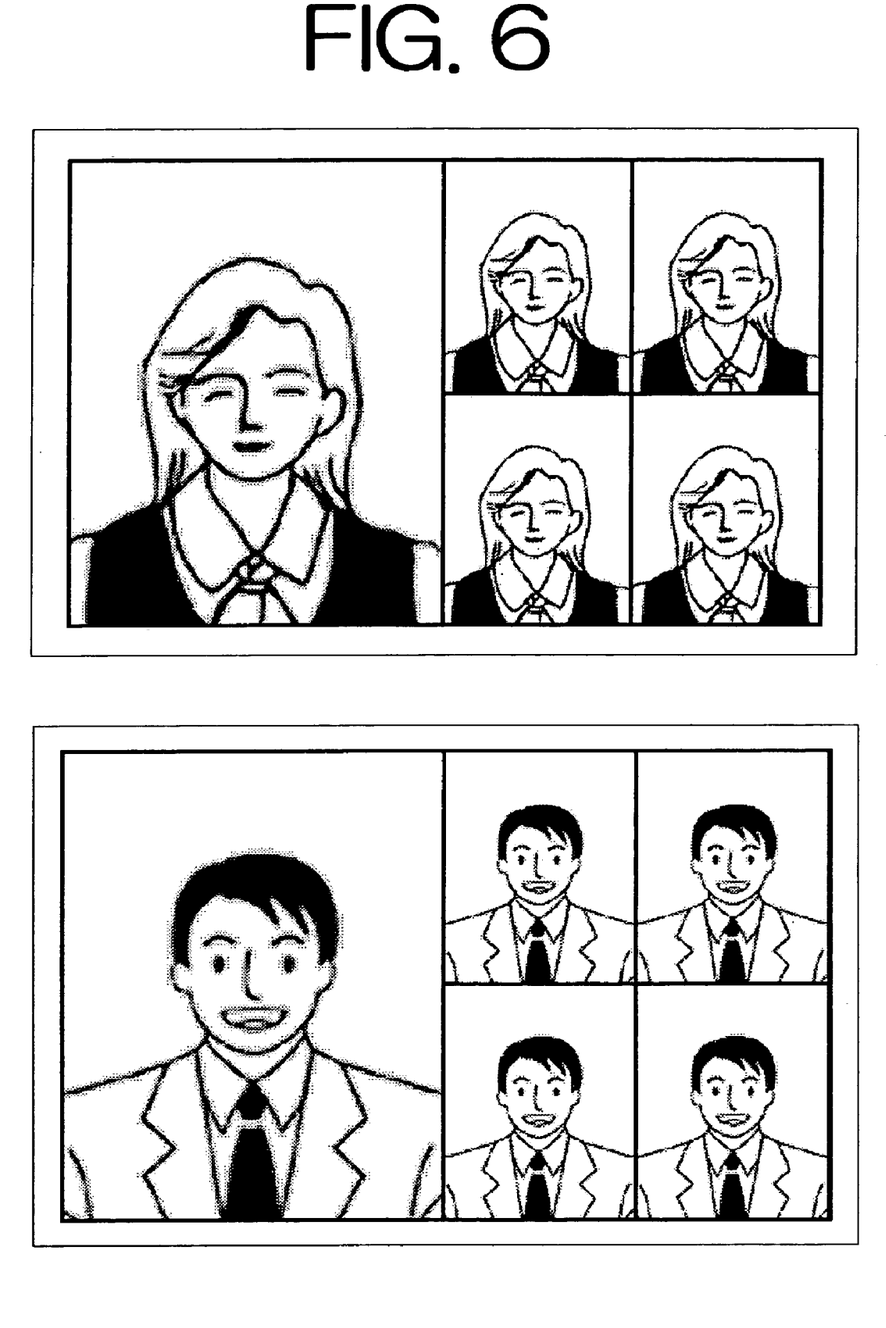
FIG. 6 is a schematic view showing layout images obtained with a different embodiment of the image processing apparatus in accordance with the present invention.

Further, in the aforesaid embodiment, the layout image R is formed by normalizing the face patterns of a plurality of different persons. Alternatively, as illustrated in FIG. 6, an album may be formed by combining a plurality of layout images, each of which comprises a plurality of images of the same person. In such cases, the image processing apparatus in accordance with the present invention can be utilized for normalizing the positions and/or the sizes of the face patterns, which are embedded in the images constituting each layout image.

What is claimed is:

1. An image processing method for obtaining a layout image signal representing a layout image, in which a plurality of person images are laid out, from a plurality of original image signals, each of the original image signals representing a person image, in which a face pattern of a person is embedded, the method comprising the steps of:

i) detecting a face candidate region from each of the original image signals, said face candidate region representing a position and/or a size of the face pattern of the person in the person image represented by each original image signal;

ii) performing a pattern matching process for each face pattern represented by said detected face candidate region to calculate an amount of displacement and/or a size difference thereof from a predetermined reference image;

iii) performing a face pattern normalizing process on each of the original image signals based on said detected face candidate region and said calculated amount of displacement and/or the size difference such that a center position having coordinates (x, y) in the face pattern embedded in the person image is transformed into a center position having coordinates (x0, y0) in the predetermined reference image, a plurality of normalized image signals being obtained from said face pattern normalizing process; and iv) laying out a plurality of images, which are represented by said normalized image signals, in a predetermined layout such that the plurality of image signals are laid out side by side, whereby the layout image signal representing the thus formed layout image is obtained.

2. The method according to claim 1, wherein said face pattern normalizing process is performed by utilizing affine transformation.

3. The image processing method according to claim 1, wherein each of the plurality of normalized image signals have a normalized person image such that each of the normalized person images are all substantially the same size.

4. The image processing method according to claim 1, wherein each of the plurality of person images that are laid out correspond to each of the original image signals in which each original image signal represents a person image, and wherein the plurality of normalized image signals that are obtained from said face pattern normalizing process are based solely on the corresponding original image signals.

5. The image processing method according to claim 1,
wherein the step of detecting the face candidate region from each of the original image signals comprises detecting edges in the face pattern and binarizing the original image signal corresponding to the face pattern to generate a binarized face candidate region, and
wherein the step of performing the pattern matching process for each face pattern represented by the detected face candidate region comprises using the binarized face candidate region to calculate the amount of displacement and/or the size difference from the predetermined reference image.

6. The image processing method according to claim 1, wherein the step of performing the face pattern normalizing process on each of the original image signals based on the detected face candidate region further comprises:
uniformizing a size v in a vertical direction of the face pattern based on the size difference from the predetermined reference image; and
uniformizing a size h in a horizontal direction of the face pattern based on the size difference from the predetermined reference image.

7. The image processing method according to claim 1, wherein the step of performing the face pattern normalizing process on each of the original image signals based on the detected face candidate region further comprises:
identifying two points (x11, y11) and (x12, y12) of the person image in the original image signal having highest degree of correlation of two points (x21, y21) and (x22, y22) of the predetermined reference image, respectively;
determining transformation coefficients a, b, c, and d, by solving for formulas $x21=ax11+by11+c, x22=ax12+by12+c,$ $y21=-bx11+ay11+d,$ and $y22=-bx12+ay12+d,$ and calculating, for each position (x1, y1) of the person image in the original image signal, a normalized position (x2, y2) in the corresponding normalized image signal, wherein $x2=ax1+by1+c$ and $y2=-bx1+ay1+d$.

8. An image processing apparatus for obtaining a layout image signal representing a layout image, in which a plurality of person images are laid out, from a plurality of original image signals, each of the original image signals representing a person image, in which a face pattern of a person is embedded, the apparatus comprising:

i) detection means for detecting a face candidate region from each of the original image signals, said face candidate region representing a position and/or a size of the face pattern of the person in the person image represented by each original image signal;

ii) pattern matching means for performing a pattern matching process for each face pattern represented by said detected face candidate region to calculate an amount of displacement and/or size difference thereof from a predetermined reference image;

iii) normalization means for performing a face pattern normalizing process on each of the original image signals based on said detected face candidate region and said calculated amount of displacement and/or the size difference such that a center position having coordinates (x, y) in the face pattern embedded in the person image is transformed into a center position having coordinates (x0, y0) in the predetermined reference image, a plurality of normalized image signals being obtained from said face pattern normalizing process; and iv) editing means for laying out a plurality of images, which are represented by said normalized image signals, in a predetermined layout such that the plurality of image signals are laid out side by side, and obtaining the layout image signal representing the thus formed layout image.

9. The apparatus according to claim 8, wherein said normalization means performs the face pattern normalizing process by utilizing affine transformation.

10. The image processing apparatus according to claim 8, wherein each of the plurality of normalized image signals have a normalized person image such that each of the normalized person images are all substantially the same size.

11. The image processing apparatus according to claim 8, wherein each of the plurality of person images that are laid out correspond to each of the original image signals in which each original image signal represents a person image, and wherein the plurality of normalized image signals that are obtained from said face pattern normalizing process are based solely on the corresponding original image signals.

12. The image processing apparatus according to claim 8,
wherein the detecting means comprises edge detecting means configured to detect edges in the face pattern and binarization means configured to binarize the original image signal corresponding to the face pattern to generate a binarized face candidate region, and wherein pattern matching means is configured calculate the amount of the displacement and/or the size difference from the predetermined reference image using the binarized face candidate region.

13. The image processing apparatus according to claim 8, wherein the normalization means is configured to uniformize a size v in a vertical direction and a size h in a horizontal direction of the face pattern based on the size difference from the predetermined reference image.

14. The image processing apparatus according to claim 8, wherein the normalization means is configured to
   identify two points (x11, y11) and (x12, y12) of the person image in the original image signal having highest degree of correlation of two points (x21, y21) and (x22, y22) of the predetermined reference image, respectively,
   determine transformation coefficients a, b, c, and d, by solving for formulas $x21=ax11+by11+c, x22=ax12+by12+c,$ $y21=-bx11+ay11+d,$ and $y22=-bx12+ay12+d,$ and calculate, for each position (x1, y1) of the person image in the original image signal, a normalized position (x2, y2) in the corresponding normalized image signal, wherein x2=ax1+by1+c and y2=-bx1+ay1+d.

15. A computer-readable medium, on which a program for causing a computer to execute an image processing method has been recorded and from which the computer is capable of reading the program, the image processing method comprising obtaining a layout image signal representing a layout image, in which a plurality of person images are laid out, from a plurality of original image signals, each of the original image signals representing a person image, in which a face pattern of a person is embedded, wherein the program comprises the procedures of:
   i) detecting a face candidate region from each of the original image signals, said face candidate region representing a position and/or a size of the face pattern of the person in the person image represented by each original image signal;
   ii) performing a pattern matching process for each face pattern represented by said detected face candidate region to calculate an amount of displacement and/or a size difference thereof from a predetermined reference image;
   iii) performing a face pattern normalizing process on each of the original image signals based on said detected face candidate region and said calculated amount of displacement and/or the size difference such that a center position having coordinates (x, y) in the face pattern embedded in the person image is transformed into a center position having coordinates (x0, y0) in the predetermined reference image, a plurality of normalized image signals being obtained from said face pattern normalizing process; and
   iv) laying out a plurality of images, which are represented by said normalized image signals, in a predetermined layout such that the plurality of image signals are laid out side by side, whereby the layout image signal representing the thus formed layout image is obtained.

16. The computer-readable medium according to claim 15, wherein said face pattern normalizing process is performed by utilizing affine transformation.

17. The computer-readable medium according to claim 15, wherein each of the plurality of normalized image signals have a normalized person image such that each of the normalized person images are all substantially the same size.

18. The computer-readable medium according to claim 15, wherein each of the plurality of person images that are laid out correspond to each of the original image signals in which each original image signal represents a person image, and wherein the plurality of normalized image signals that are obtained from said face pattern normalizing process are based solely on the corresponding original image signals.

19. The computer-readable medium according to claim 15,
   wherein the procedure of detecting the face candidate region from each of the original image signals comprises detecting edges in the face pattern and binarizing the original image signal corresponding to the face pattern to generate a binarized face candidate region, and
   wherein the procedure of performing the pattern matching process for each face pattern represented by the detected face candidate region comprises using the binarized face candidate region to calculate the amount of displacement and/or the size difference from the predetermined reference image.

20. The computer-readable medium according to claim 15, wherein the procedure of performing the face pattern normalizing process on each of the original image signals based on the detected face candidate region further comprises:
   uniformizing a size v in a vertical direction of the face pattern based on the size difference from the predetermined reference image; and
   uniformizing a size h in a horizontal direction of the face pattern based on the size difference from the predetermined reference image.

21. The computer-readable medium according to claim 15, wherein the procedure of performing the face pattern normalizing process on each of the original image signals based on the detected face candidate region further comprises:
   identifying two points (x11, y11) and (x12, y12) of the person image in the original image signal having highest degree of correlation of two points (x21, y21) and (x22, y22) of the predetermined reference image, respectively;
   determining transformation coefficients a, b, c, and d, by solving for formulas $x21=ax11+by11+c, x22=ax12+by12+c,$ $y21=-bx11+ay11+d,$ and $y22=-bx12+ay12+d,$ and calculating, for each position (x1, y1) of the person image in the original image signal, a normalized position (x2, y2) in the corresponding normalized image signal, wherein x2=ax1+by1+c and y2=-bx1+ay1+d.

* * * * *